(12) United States Patent
Heinrich et al.

(10) Patent No.: US 8,376,649 B2
(45) Date of Patent: Feb. 19, 2013

(54) COUPLING DEVICE FOR TRANSMITTING A TORQUE

(75) Inventors: Johannes Heinrich, Friedrichsdorf (DE); Michael Schäfer, Ketsch (DE); Jochen Bölling, Baden-Baden (DE); Dietmar Strauss, Kraichtal (DE); Till Ebner, Seeheim (DE)

(73) Assignee: BorgWarner Inc., Auburn Hills, MI (US)

( * ) Notice: Subject to any disclaimer, the term of this patent is extended or adjusted under 35 U.S.C. 154(b) by 581 days.

(21) Appl. No.: 12/083,703

(22) PCT Filed: Oct. 15, 2006

(86) PCT No.: PCT/EP2006/009963
§ 371 (c)(1),
(2), (4) Date: Mar. 23, 2009

(87) PCT Pub. No.: WO2007/045418
PCT Pub. Date: Apr. 26, 2007

(65) Prior Publication Data
US 2009/0203453 A1    Aug. 13, 2009

(30) Foreign Application Priority Data

| Oct. 17, 2005 | (DE) | 10 2005 049 913 |
| Nov. 14, 2005 | (DE) | 10 2005 054 526 |
| Dec. 2, 2005  | (DE) | 10 2005 057 871 |
| Mar. 2, 2006  | (DE) | 10 2006 010 278 |

(51) Int. Cl.
*F16D 3/77* (2006.01)

(52) U.S. Cl. .................. 403/359.4; 464/75
(58) Field of Classification Search .......... 464/74–76; 403/359.4, 359.5; 192/110 R
See application file for complete search history.

(56) References Cited

U.S. PATENT DOCUMENTS

| 1,803,077 | A  | * | 4/1931  | Spase ............... 464/75 X |
| 1,803,995 | A  |   | 5/1931  | Roland |
| 2,089,168 | A  | * | 8/1937  | Brown ............ 403/359.5 X |
| 2,625,415 | A  |   | 1/1953  | Smith |
| 4,514,108 | A  | * | 4/1985  | Sagady ............ 403/359.5 |
| 4,875,796 | A  |   | 10/1989 | Storm |
| 5,564,981 | A  |   | 10/1996 | Iwabuchi et al. |
| 5,674,026 | A  |   | 10/1997 | Ishibashi et al. |
| 6,257,798 | B1 |   | 7/2001  | Wormsbaecher |
| 2003/0083136 | A1 | | 5/2003  | Park |
| 2005/0192103 | A1 | | 9/2005  | Hauck |
| 2007/0281518 | A1 | | 12/2007 | Braford, Jr. |

FOREIGN PATENT DOCUMENTS

| BE | 535319      | 12/1958 |
| DE | 1267480     | 5/1968  |
| DE | 10 205 767  | 8/2003  |
| DE | 10 227 396  | 1/2004  |
| FR | 878126      | 1/1943  |
| GB | 159580      | 2/1921  |
| GB | 276 000     | 5/1928  |

(Continued)

*Primary Examiner* — Gregory Binda
(74) *Attorney, Agent, or Firm* — Warn Partners, P.C.

(57) ABSTRACT

A coupling device is provided for transmitting a torque between a drive element and a clutch, for example of a motor vehicle. The coupling device includes a first shaft and a second shaft being coupled together in a positive fit. The device is equipped with an elastic element which in the positive-fit connection generates a pre-tension to suppress rattling noises.

8 Claims, 8 Drawing Sheets

FOREIGN PATENT DOCUMENTS

| | | |
|---|---|---|
| GB | 307 921 | 10/1929 |
| JP | 6058341 | 3/1994 |
| JP | 2003-028180 | 1/2003 |
| JP | 2005-121214 | 5/2005 |
| JP | 2006-200690 | 8/2006 |
| WO | WO 2005 121581 | 12/2005 |

* cited by examiner

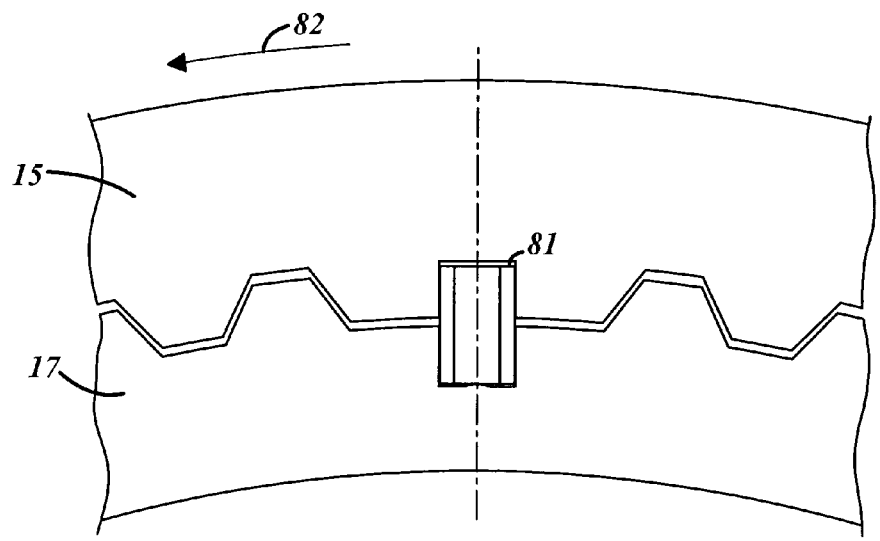
*FIG. 6*
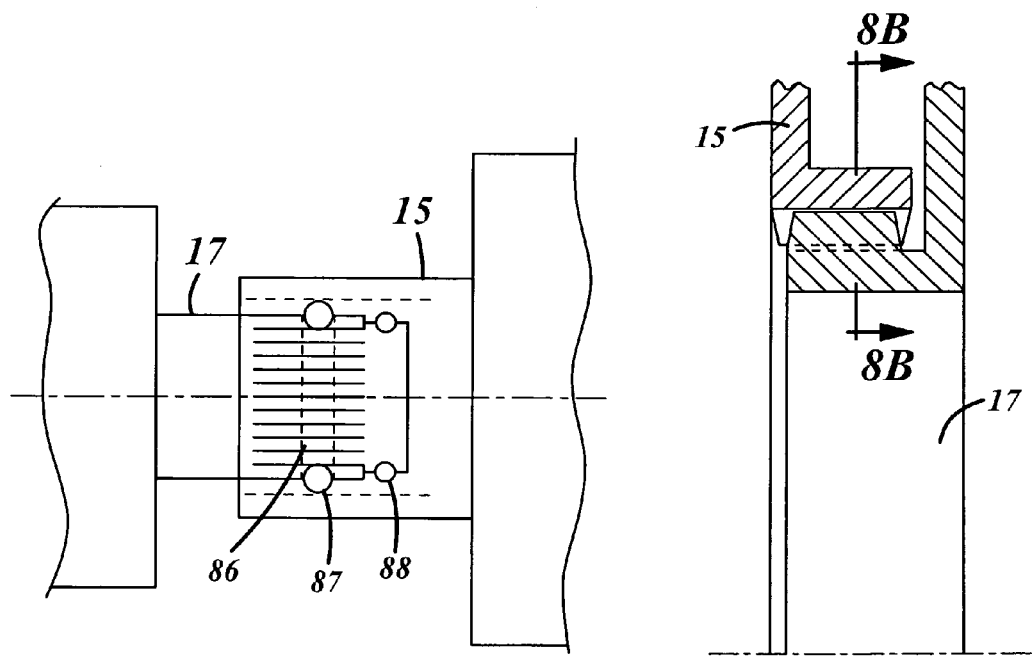
*FIG. 7*
*FIG. 8A*

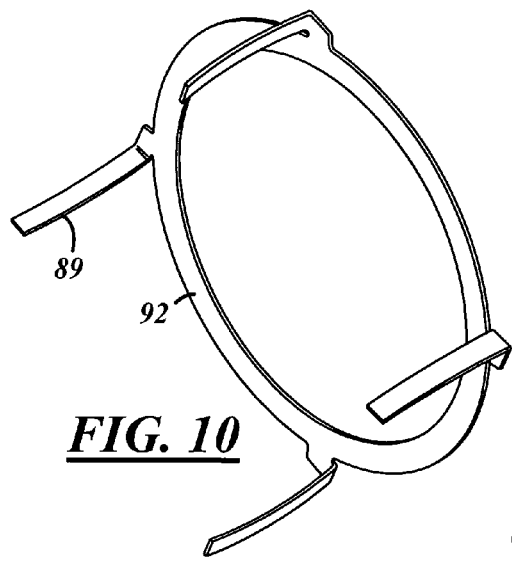
*FIG. 10*
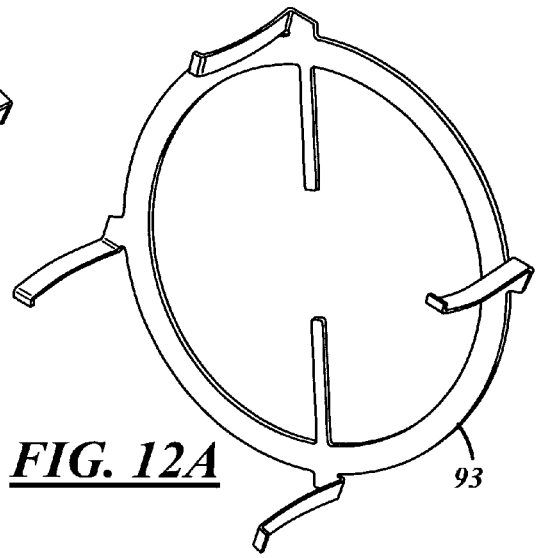
*FIG. 12A*
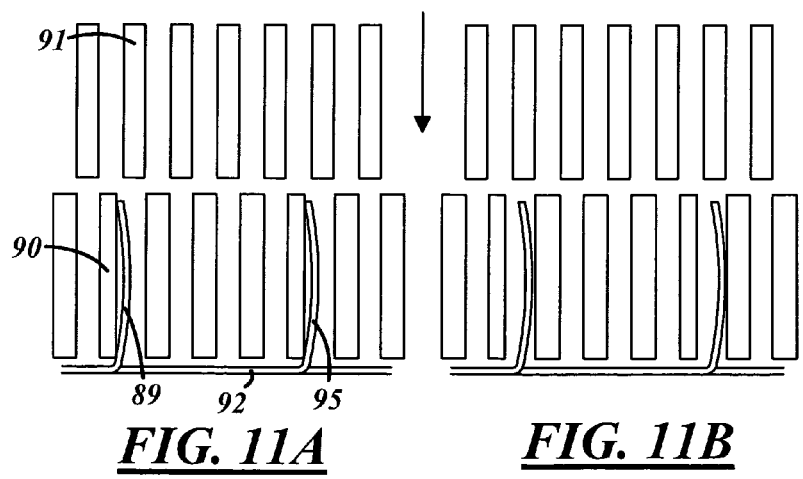
*FIG. 11A*  *FIG. 11B*

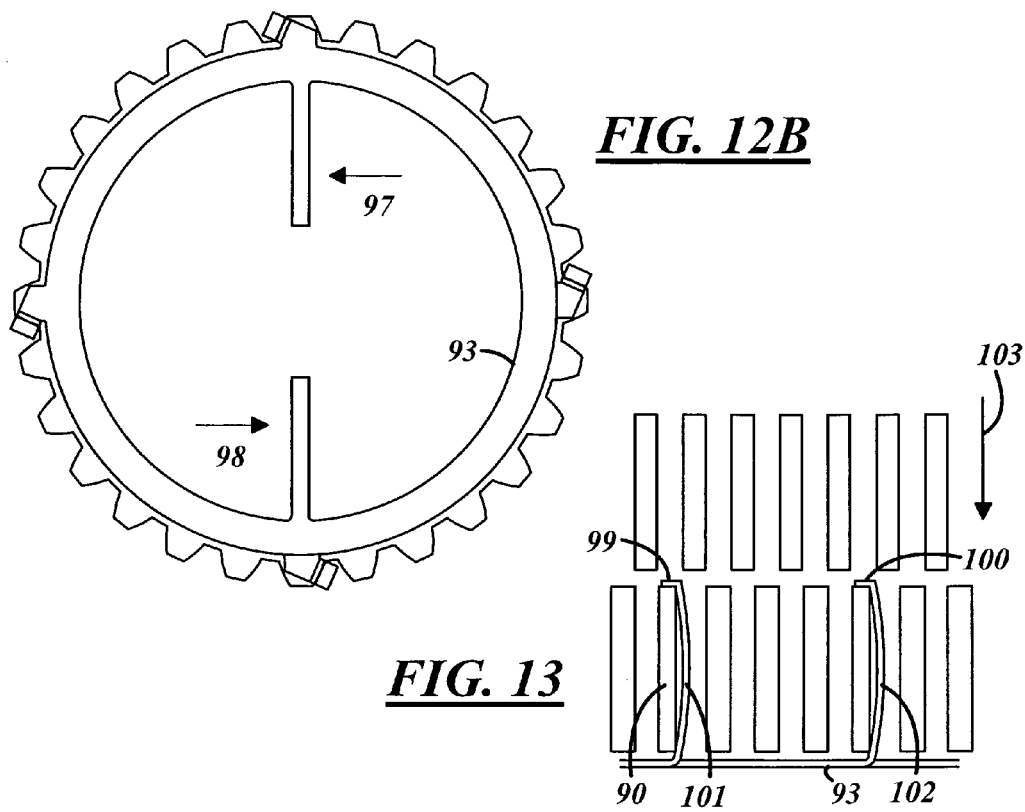
FIG. 12B
FIG. 13
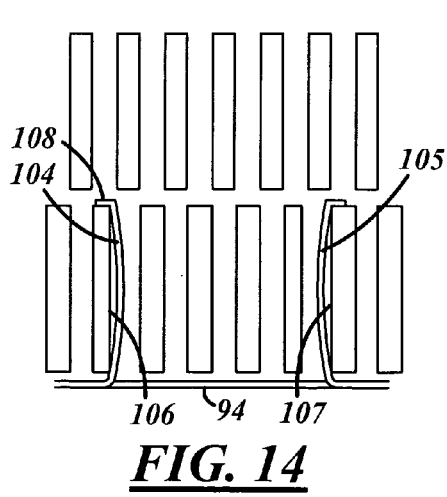
FIG. 14
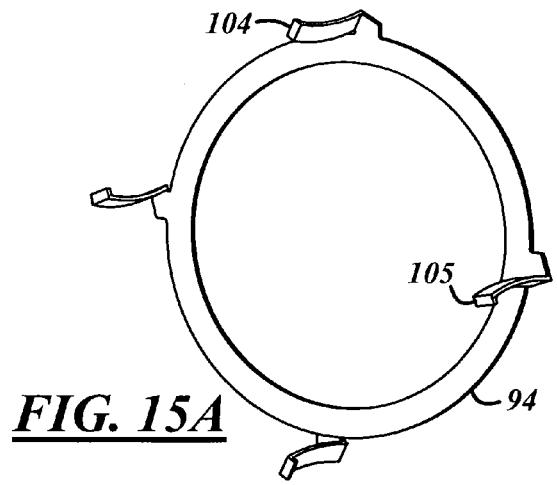
FIG. 15A

COUPLING DEVICE FOR TRANSMITTING A TORQUE

CROSS-REFERENCE TO RELATED APPLICATIONS

This application is a National Stage of International Application No. PCT/EP/009963, filed Oct. 15, 2006, which claims priority to European Patent Applications 10 2005 049913.9, filed Oct. 17, 2005; 10 2005 054526.2, filed Nov. 14, 2005; 10 2005 057871.3, filed Dec. 2, 2005; and 10 2006 010278.9, filed Mar. 2, 2006. The disclosures of the above applications are incorporated herein by reference.

FIELD OF THE INVENTION

The invention relates to a coupling device for transmitting a torque between a drive element and a clutch. Such coupling devices are used in motor vehicles, for example, for the connection between an internal combustion engine and a clutch. The clutch represents an adjustable connection to a transmission, which in turn drives the wheels of the motor vehicle.

A clutch of this type is disclosed, for example, by EP 1195537 B1 or EP 1522753 A1.

BACKGROUND OF THE INVENTION

The known clutches take the form of a dual clutch, for example, which allows rapid shifting of the transmission and which can be hydraulically actuated.

The clutches often have torsion dampers in the form of annular spring devices, the torque being transmitted circumferentially between a drive side and a driven side and a driven side by means of the spring elements. The spring elements on the one hand absorb impacts and on the other serve to damp drive-side vibrations originating from the internal combustion engine, for example.

A clutch of this type is typically coupled to a drive element by means of a first shaft, often referred to as a flange, and a second shaft enclosing the former, the shafts being coupled by an interlocking connection in such a way that a rotational movement can be transmitted between them. The second shaft is here often also referred to as a flange. Since the coupling described must permit certain relative movements, however, and is also designed for ease of assembly, it has a certain play, for example a joining play, which means that operating noises are generated.

The object of the invention now is to reduce or prevent the generation of noise in a coupling device of the aforesaid type and to find a simple design solution to this which is as cost effective as possible.

SUMMARY OF THE INVENTION

According to the invention the object is achieved by a coupling device.

At least one elastic element serves to generate a pre-tensioning in the positively interlocking connection between the two shafts, which prevents or at least reduces any rattling and the corresponding noise generated under load changes. The pre-tensioning is here kept to an order of magnitude which does not impede the actual transmission of torque or force in the positively interlocking connection and does not make assembly more difficult, but which is large enough to achieve the object of the invention. A pre-tensioning in the order of 10 Nm to 100 Nm is typically generated by at least one elastic element. Greater pre-tensionings are also feasible, especially in the drive trains of trucks or heavy-duty drives.

The play in the coupling device makes it possible to compensate for small relative movements between the clutch and the drive element. The pre-tensioning generated is not intended to prevent this. The pre-tensioning in respect of the first and the second shaft may be directed in a circumferential direction, in order to ensure that the corresponding faces of the shafts bear directly on one another, so that rotational movements, at least in one direction, can be transmitted without any play. The pre-tensioning may also be directed radially, however, in order to thereby generate at least frictional forces, which will make a relative movement between the first and the second shaft more difficult, or will prevent this.

The elastic element may here also be formed by the first shaft, for example. This may be of an elastic shape, achieved by means of recesses, for example, in such a way that it has a larger diameter in the relaxed state than whilst coupled to the second shaft. In order to produce the positively interlocking connection it may be radially compressed, thereby developing an elastic pre-tensioning in a radial direction relative to the second shaft enclosing it. Conversely, the second shaft may also be of elastic shape, achieved by means of a slot, for example, which runs in an axial and a radial direction in the inner circumferential surface of the second shaft and allows the second shaft to expand, generating an opposing elastic force.

The first shaft and the second shaft or either one of these may be composed at least partially of an elastic material, for example, in order to generate the corresponding forces. A material is to be selected for this, which is strong enough to absorb the forces transmitted. In this context a deformable metal, for example, may also be provided as elastic material.

According to the invention the pre-tensioning may also be generated by an insert, which is arranged between the first and the second shaft. This insert may be of elastic shape or of volumetrically elastic design. It may be provided either in the area of the positively interlocking connection of the two shafts or also in an axial area, into which the positively interlocking connection extends. The element may take the form, for example, of an elastomer O-ring, which is arranged between the shafts and which generates a radial pre-tension.

In order to produce a positively interlocking connection, the first shaft may carry an external toothing, which meshes in an internal toothing of the second shaft. Such toothing represents a particularly effective way of transmitting high torques or large power outputs via such a coupling device. In this case the first shaft and the second shaft can be axially pushed together during assembly, since they normally have some play.

According to one design variant of the invention, an insert is additionally incorporated, which can, for example, at least also partially replace a toothing element of the first and/or the second shaft. For example, one tooth of the toothing system extending over a certain area in the axial direction of the shafts may be entirely or partially replaced by an elastic element. For this purpose a recess, into which the elastic insert can be introduced, may be provided at the point in a circumferential direction where a tooth would normally have to be provided on the first or second shaft, said insert likewise engaging in a recess in the other shaft, thereby producing a tongue- and groove connection. The insert may then take the form of a leaf spring or generally a spring plate, and may have a corresponding shape which can be elastically compressed in a radial and/or tangential direction of the toothing. However, the insert may also take the form of an elastomer body or a spring pin, which is compressible.

In the case of spring plates which are inserted into the toothing interstice, these may be suitably distributed symmetrically on the circumference of the toothing, in order to limit imbalances and to distribute the forces transmitted in an optimum way. In order to facilitate assembly and to stabilize the arrangement, it may be advisable to fix multiple spring plates to a ring, so that they can be inserted into the toothing by means of the ring or better still can be connected to one of the toothing systems, either the external toothing or the internal toothing, before fitting the toothing together. The spring plates can then either bear against tooth flanks oriented in the same circumferential direction or also sometimes against flanks oriented in opposite circumferential directions. In the latter case the spring plate arrangement is capable of automatically centering itself together with the ring, whereas in the former case it may be advantageous to pretension the ring in a circumferential direction, in such a way that the spring plates are pressed against the corresponding flanks.

The individual spring plates are bent in an axial direction of the shafts or in a radial direction, in such a way that they bear against the tooth flanks but can be elastically pressed further onto these. The degree of bending depends on the desired pre-tensioning or the torque that is normally to be transmitted without rattling. Instead of the spring plates, other types of spring elements can in principle be chosen, such as elements of an elastic material, for example.

At its end remote from the ring in an axial direction of the shafts, each spring element may carry an angle plate, which grips around the respective tooth on which the spring plate bears, towards its end face. Where the toothing is inserted after the introduction of the spring plates, this hooked configuration of the spring plates serves to ensure that fitting together is not impeded by the free ends of the spring plates.

It is to be fundamentally noted that, even with another type of positively interlocking connection of two shafts, multiple elastic elements, for insertion between the elements of the connection, can also be fixed at spatial intervals on one common support element, in order to stabilize the arrangement and to facilitate assembly.

On the side of the drive element the coupling device is connected to the latter either via a swash plate and/or via a flywheel or directly to the drive element. On the driven side the coupling device may be connected to a torsion damper, which may be arranged annularly coaxial with the clutch, for example.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 6 shows a similar representation to FIG. 5, the insert having a different shape, FIG. 7 shows a schematic representation of the toothing, an O-ring being provided as insert, FIGS. 8A and 8B show schematic representations of a shaft with external toothing, FIG. 10 shows a ring with spring elements fixed thereto, FIG. 11A shows a developed representation of a toothing with spring elements, FIG. 11B shows the representation in FIG. 11A with spring plates released from the toothing, FIGS. 12A and 12B show a ring as in FIG. 10 with additional elements for applying a pre-tensioning in a circumferential direction, FIG. 13 shows a developed representation of a toothing with spring elements with angle plates, FIG. 14 shows a representation as in FIG. 13 with spring elements arranged in opposite directions (on opposing tooth flanks), FIGS. 15A and 15B show views of the arrangement in FIG. 14.

DETAILED DESCRIPTION OF THE DRAWINGS

The following description of the preferred embodiment(s) is merely exemplary in nature and is in no way intended to limit the invention, its application, or uses.

Figure 1:
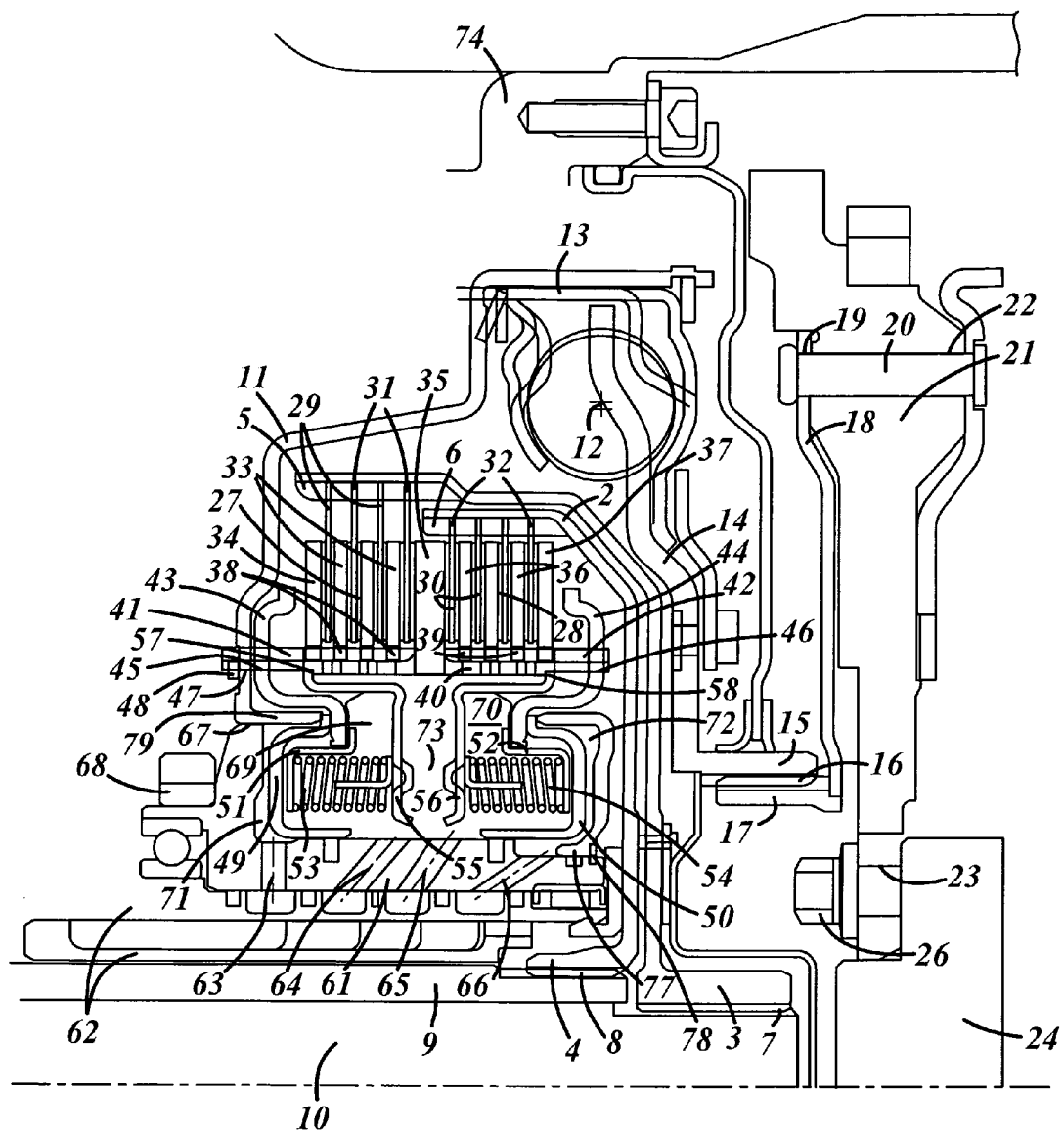
FIG. 1 shows a basic functional diagram of a clutch having a torsion damper, which is connected to a coupling device according to the present invention.

FIG. 1 illustrates a possible basic construction and the operating principle of a dual clutch designed according to the invention, by reference to a section from a motor vehicle drive train, selected by way of example.

A crankshaft 24 which, for example, is coupled to an internal combustion engine, a motor or the like, is indicated on the right-hand side of the figure. This side represents the drive side of the drive train.

Visible on the left-hand side of the drawing are two transmission input shafts, that is a central or solid shaft 10 and a hollow shaft 9, which are led out of the clutch housing 74 of the dual clutch and are coupled, for example, to a transmission or the like, not represented here. This side represents the driven side of the drive train.

Thus the first transmission input shaft (central or solid shaft 10) may be intended for the operation of all the odd-numbered gears (for example, 1, 3, 5 . . . ) and the second transmission input shaft (hollow shaft 9) for the operation of all the even-numbered gears (for example, 2, 4, 6 . . . ) of the motor vehicle. The reverse gear could be assigned both to the first transmission input shaft (central or solid shaft 10), and to the second transmission input shaft (solid shaft 9) of the transmission.

The drive train further comprises a flywheel mass 21 in the form of a flywheel, a swash plate 18, a torsional vibration damper 12 and the aforementioned dual clutch.

This drive train is enclosed by an outer housing. This outer housing is formed by the clutch housing 74. This clutch housing 74 consequently encloses the two clutches in the form of wet multi-plate clutches, the torsional vibration damper 12, the swash plate 18 and the flywheel mass 21.

The rotational or torsional vibration damper 12 is embodied in a manner known in the art. On the input side it has a primary element 14 in the form of a half-shell. On the output side a secondary element is provided, comprising a first half-shell 13 and a second half-shell 11, which at the same time forms the clutch housing. The primary element 14 and the secondary element 13, 11 are coupled via a plurality of spring assemblies arranged on the outer circumference of the torsional vibration damper 12 for the transmission of a torque in the direction of rotation. An example of a spring assembly is shown in the drawing.

The two half-shells 11 and 14 of the torsional vibration damper 12 enclose the two individual clutches of the dual clutch. They are rotationally fixed together by means of an axial toothing and are axially pressed together by a disk spring, for example, generating an additional frictional connection.

Each clutch comprises an outer plate carrier 1, 2 and a common inner plate carrier 40. The outer plate carrier of the first clutch will hereinafter be referred to as the first outer plate carrier 1, the outer plate carrier of the second clutch as the second outer plate carrier 2.

The two outer plate carriers 1, 2 are of half shell-shaped design, the first outer plate carrier 1 gripping around the second outer plate carrier 2 and projecting in an axial direction. The inner plate carrier 40 is of a substantially cylindrical shape and extends over the axially running area of the half-shells 1, 2.

The two outer plate carriers 1, 2 have internal toothing systems 5, 6, which serve for the axially displaceable but substantially rotationally fixed guidance of friction plates 29, 30, in this case each having four corresponding external toothing systems 31, 32. Said friction plates will also usually be referred to as outer plates 29, 30.

Similarly, external toothing systems 41, 42, in which friction plates having internal toothing systems, the so-called inner plates 36, are guided so that they are axially displaceable but rotationally fixed, are arranged on the outer circumference of the inner plate carrier sections of the common inner plate carrier 40 assigned to the respective outer plate carriers 1, 2. The two inner plate carrier sections are separated from one another by a common end plate 35.

Similarly, like the aforesaid inner plates 36, pressure plates 34, 37 are guided so that they are axially displaceable but substantially rotationally fixed at each of the two outer ends of the common inner plate carrier 40.

In a manner known in the art, the outer friction plates/outer plates 29, 30, the inner friction plates/inner plates 33, 36 together with the two pressure plates 34, 37 and the common end plate 35 in each case intermesh in one another like toothing systems, each forming a plate pack 27, 28 associated with a clutch.

The two plate packs 27, 28 with the corresponding friction plates 29, 30, 33, 34, 35, 36, 37 are therefore arranged axially in series on the common inner plate carrier 40. In the present exemplary embodiment the friction surfaces of all friction plates 29, 30, 33, 34, 35, 36, 37 are substantially equal in size, so that the individual clutches afford equivalent operating performance. It is obviously also possible for the friction surfaces of the friction plates to have diameters of different size.

Piston-cylinder units, which serve for operating the clutches and which are described in detail below, also form integral components of the clutches. In particular, a hydraulically actuated operating piston 43, 44 is assigned to each clutch. Each of these operating pistons 43, 44 can be pressed against one of the pressure plates 34, 37, transmitting force and producing a frictional connection between the individual friction plates 29, 30, 33, 34, 35, 36, 37, and thereby operating the respective clutch.

As can be seen from FIG. 1, the two clutches are operated inwards, the reaction forces acting against the common end plate 35.

The common inner plate carrier 40 passes through the two annular operating pistons 43, 44 needed to operate the clutches. For this purpose the inner plate carrier at each end has webs essentially running axially over the outer circumference, which engage like toothing through corresponding openings 45, 46 in the respective operating pistons 43, 44. At the end these webs also correspondingly engage in openings 47 in the clutch housing 11. The openings 47 in the clutch housing 11 (and generally also the openings 45, 46 in the operating pistons 43, 44) are matched to one another in their peripheral dimensions, so that any relative rotation is impossible. The inner plate carrier 40 is in this way rotationally fixed to the clutch housing 11.

In order to prevent an axial displacement of the inner plate carrier 40, a locking ring 48 is provided, which holds the inner plate carrier 40 fixed to the clutch housing 11.

At a joint 67 the clutch housing 11 is rigidly connected to a clutch hub 61. This clutch hub 61 grips coaxially around the two transmission input shafts 9, 10. The clutch hub 61 carries a half shell-shaped cylinder 77. This cylinder 77 is limited in its axial displacement by a locking ring 78.

In a manner corresponding to the cylinder 77, a cylinder 79 forms an integral part of the clutch housing 11. The respective axially displaceable operating pistons 43, 44 are guided on the two cylinders 77, 79. The cylinder 77 and the operating piston 44 serve as support and centering for the inner plate carrier 40.

In addition to the aforementioned operating pistons 43, 44, by means of which the respective pressure plates 34, 37 of the plate packs 27, 28 can be displaced in the direction of the common end plates 35, the operating devices for the two clutches each comprise a pressure piston 49, 50, a piston 51, 52, a compensating piston 55, 56 and a plurality of circumferentially arranged helical springs 53, 54. The respective operating pistons 43, 44 are outwardly braced against the respective pressure pistons 49, 50, which are guided so that they are axially displaceable on the cylinders 79, 77 and on the outer circumference of the clutch hub 61. Inwardly the operating pistons 43, 44 are braced against the pistons 51, 52. These in turn are inwardly braced against the helical springs 53, 54. The helical springs 53, 54 are inwardly braced against the external faces of the compensating pistons 55, 56. These compensating pistons 55, 56 are braced by their internal faces against radially inward-facing circumferential webs 57, 58 on the inner plate carrier 40.

Although the entire clutch system could be supported directly on the second transmission input shaft (hollow shaft 9), in the present exemplary embodiment a separate flange-like component, hereinafter referred to as a carrier 62, is provided, which grips coaxially around the two transmission input shafts, the hollow shaft 9 and the solid shaft 10 and on which the clutch hub 61 is rotatably supported. Slide bearings are here used to support the clutch hub 61 on the carrier 62. Alternatively, roller bearings (needle bearings) may be used to give reduced moments of friction.

The carrier 62 may be integrally formed or may be of multipart construction both axially and radially. In this case the carrier 62 is of two-part design. It comprises a casing and a bushing enclosed by the former. In its outer circumference the cylindrical shell-shaped bushing has longitudinal grooves of different length, running in an axial direction. The casing has four grooves running in a circumferential direction corresponding to the arrangement of the aforementioned longitudinal grooves. These circumferential grooves are connected by radial openings (not shown here) to the corresponding longitudinal grooves.

Corresponding to the circumferential grooves, the clutch hub 61 has four openings essentially running radially and in part axially inclined, which are hereinafter referred to as hydraulic fluid ducts 63, 64, 65 and 66. These hydraulic fluid ducts 63, 64, 65, 66 serve to supply the volumes (first hydraulic fluid operating chamber 71, second hydraulic fluid operating chamber 72, first hydraulic fluid compensation chamber 69, second hydraulic fluid compensation chamber 70, coolant chamber 73) formed by the pistons 43, 44, 49, 50, 55, 56 with hydraulic fluid.

The first hydraulic fluid operating chamber 71 can be pressurized by hydraulic fluid via the first hydraulic fluid duct 63. This hydraulic fluid pressure presses the pressure piston 49 and thereby the operating piston 45 and the piston 51 inwards against the pressure of the helical springs 53. As a result of such a displacement of the operating piston 45, its outer circumference is pressed against the pressure plate 34 of the first clutch, operating the latter.

The second hydraulic fluid operating chamber 72 can in the same way be pressurized by hydraulic fluid via the fourth hydraulic fluid duct 66. This hydraulic fluid pressure means that the pressure piston 50 and thereby the operating piston 44 and the piston 52 are pressed inwards against the pressure of the helical springs 54. As a result the outer circumference of the operating piston 44 is correspondingly pressed against the pressure plate 37 of the second clutch, operating the latter.

The hydraulic fluid compensation chambers 69, 70 on the one hand and also the coolant chamber 73 are supplied with hydraulic fluid via the two hydraulic fluid ducts 64 and 65.

The hydraulic fluid in the hydraulic fluid compensation chambers 69, 70 serves to generate a centrifugally induced hydraulic fluid counter-pressure, which counteracts the centrifugally induced pressure increase in the respective hydraulic fluid operating chamber 71, 72.

The hydraulic fluid in the coolant chamber 73 is led through radial openings (not shown here) in the inner plate carrier 40 to the friction plates 29, 30, 33, 34, 35, 36, 37 in order to cool the friction plates 29, 30, 33, 34, 35, 36, 37.

The components of the drive train described in detail above are connected to one another in the following way. The crankshaft 24 is bolted to the inner circumference of the flywheel mass 21 (bolt 26, bore 23). The outer circumference of the flywheel mass 21 is riveted to the outer circumference of the swash plate 18 (outer edge bore 19, rivets 20, bore 22). The inner circumference of the swash plate 18 carries a first shaft 17, also referred to as an inner flange, having an external toothing. This external toothing meshes in the manner of splines 16 in an internal toothing of the second shaft 15, which is connected to the primary element 14 of the torsional vibration damper 12 and it is therefore also sometimes referred to as a primary flange.

The secondary element 13 of the torsional vibration damper 12, which at the same time forms the clutch housing, is rotationally fixed to the inner plate carrier 40 of the dual clutch in the manner described above.

The two clutches (plate packs 27, 28; the operating pistons 44, 45) controllably connect the inner plate carrier 40 to the outer plate carriers 1, 2, which via their flanges 3, 4 are in turn rotationally fixed by means of splines 7, 8 to the two transmission input shafts 9, 10.

A torque introduced via the crankshaft 24 can therefore be transmitted to one of the two transmission input shafts 9, 10 by means of the dual clutch.

For the sake of completeness it should be mentioned that a rotational movement introduced via the crankshaft 24 also drives an hydraulic pump (not shown here) via a pump drive gear 68 arranged on the clutch hub 61, in order to supply the aforementioned hydraulic fluid pressure.

Figure 2:
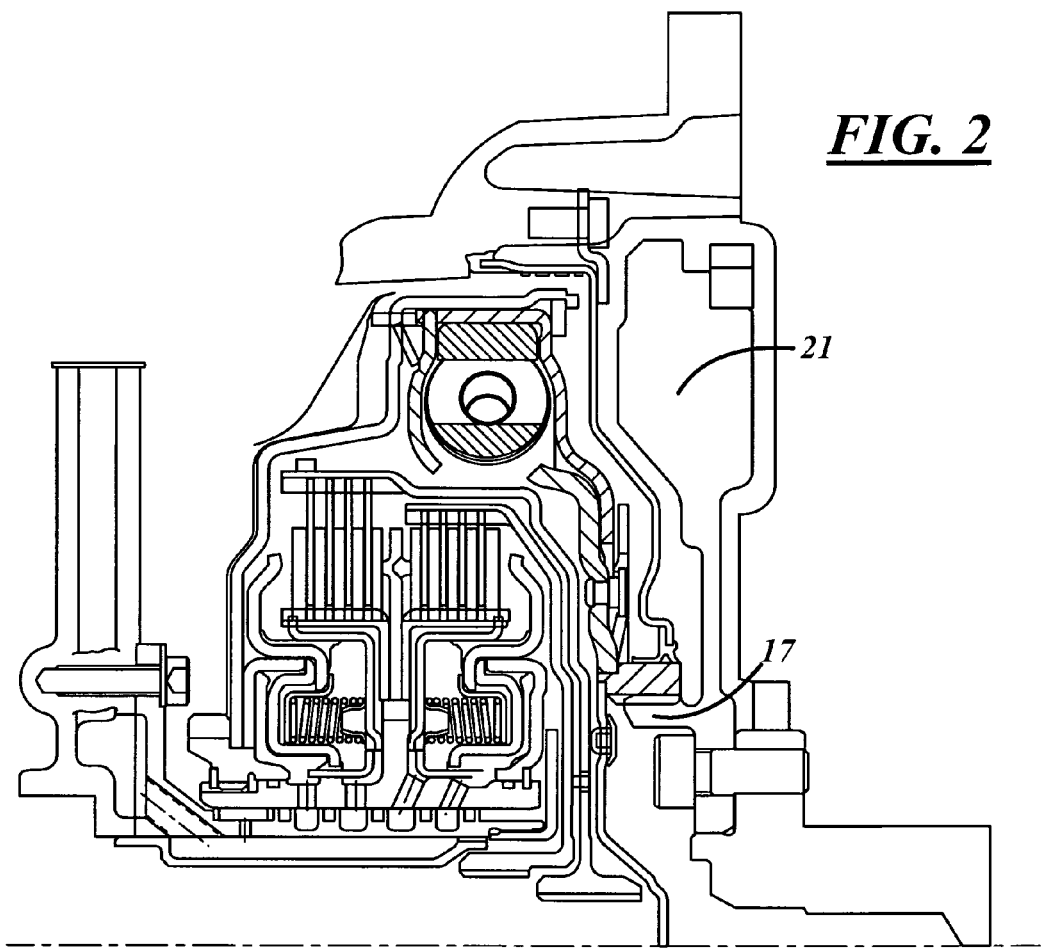
FIG. 2 shows a coupling device, which is directly coupled to a flywheel of a drive element.

FIG. 2 shows a coupling device similar to that represented in FIG. 1, but in contrast to the design construction shown in FIG. 1 the first shaft is not connected to the swash plate 18 but directly to the flywheel mass 21. A swash plate is not provided in this design construction.

Figure 3:
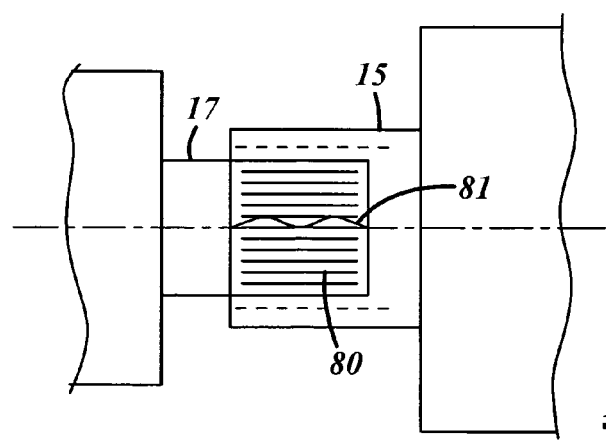
FIG. 3 shows a schematic representation of a toothing between the first and the second shaft, together with a pre-tensioning element.

FIG. 3 in an enlarged, sectional representation schematically shows the first shaft 17 and the second shaft 15. The first shaft 17 carries an external toothing 80, which meshes in an internal toothing (not further represented) of the second shaft 15. A spring steel leaf spring 81, which is inserted into the toothing and is bent in a double S-shape in such a way that it introduces a circumferential pre-tension between the inner toothing and the outer toothing, is represented schematically.

The leaf spring 81 can be inserted under axial telescoping of the first and the second shaft and is pre-tensioning in such a way that the two shafts are pressed together at the expense of the circumferential play.

FIG. 6 shows this arrangement in a cross-section, a groove in the first shaft 17 being designed to run axially between two teeth of the toothing and a further groove running parallel to the former being arranged in the inner circumferential surface of the first shaft 15. The leaf spring 81 engages in both grooves and aligns these in relation to one another in such a way that a relative movement in a circumferential direction, which is indicated by the arrow 82, would lead to a further deformation of the leaf spring, thereby generating elastic recovery forces. The two shafts are therefore connected to one another in such a way that they are fixedly positioned in relation to one another until such time as a specific, circumferentially acting force is exceeded. If this force is exceeded, the leaf spring is deformed and the two shafts can be turned so far in opposition to one another that the toothing systems bear against one another in one or the other direction of rotation.

Figure 4:
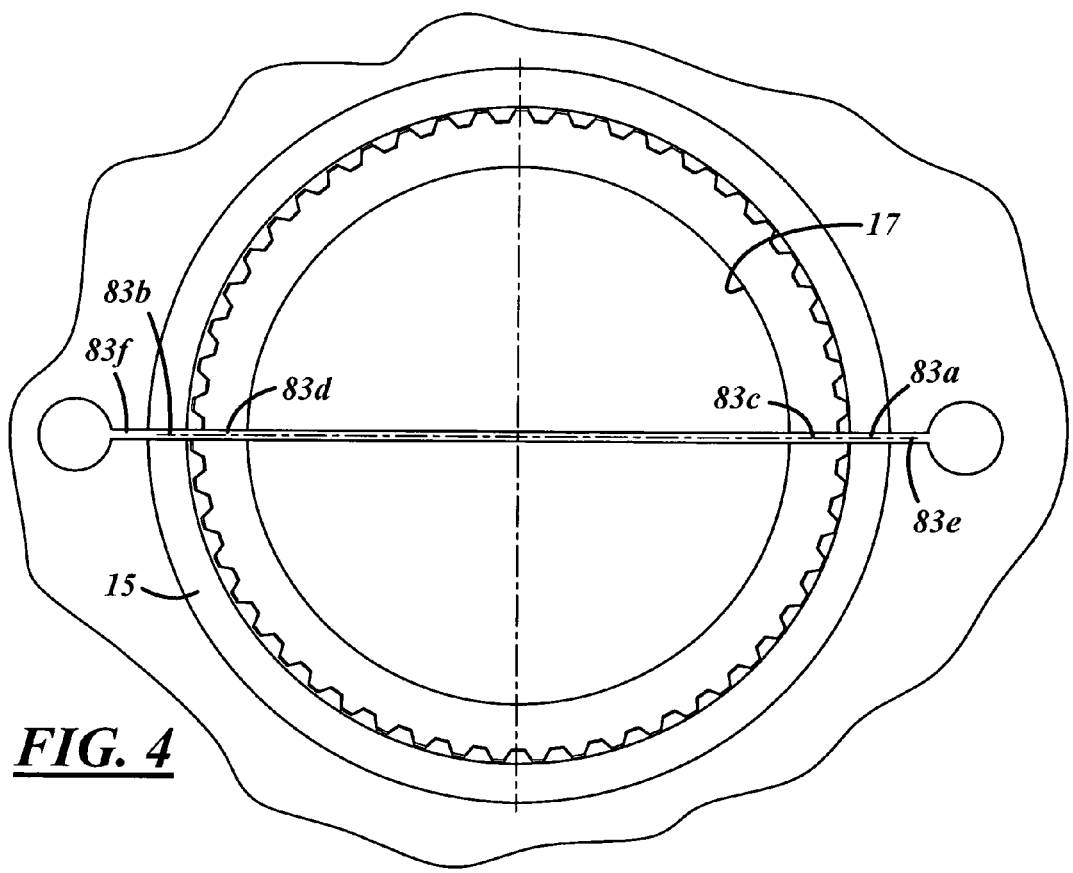
FIG. 4 shows a cross section through the first and the second shaft, FIG. 5. shows a detailed view of the toothing between the first and the second shaft, with an insert interposed between them.

FIG. 4 shows an embodiment of the invention, in which the second shaft 15 is of elastic design in that a pair of diametrically opposing slots 83*a*, 83*b* are provided therein, running in a radial and in an axial direction. This pair of slots 83*a*, 83*b* allows a radial expansion of the second shaft 15, so that the first shaft 17 can be pushed into the second shaft under elastic expansion of the second shaft 15, even if its outside dimensions are slightly greater than the inside dimensions of the second shaft. This gives rise to a radial pressure, which compensates for the existing radial play, so that any rattling of the shafts against one another is prevented. In a circumferential direction, frictional forces are generated, which are overcome only in the event of a load change of a specific magnitude. In any event the torque transmission is not adversely affected by the elasticity of the second shaft. FIG. 4 shows that the first, inner shaft 17 also has a corresponding pair of slots 83*c*, 83*d*. This need not necessarily be the case, however, since both shafts 15, 17 or just one shaft, the outer shaft 15 or the inner shaft 17, may have such a pair of slots, in order to permit a radial expansion or a radial compression.

For the elastic formation of the first and/or second shaft, further pairs of slots may be provided, preferably again diametrically opposing pairs of slots. Additionally or as an alternative, additional individual slots may be provided, but without a second slot to form a pair of slots. Each slot can moreover extend in an axial direction over part of the length or over the entire length of the respective shaft.

In a preferred design variant of the invention four to six pairs of diametrically opposing slots are provided. In this case each slot may again extend in an axial direction over part of the length or over the entire length of the respective shaft.

As shown in FIG. 4, at least one pair of slots 83e, 83f is provided in the component, in this case the swash plate 18, connected to the inner shaft 17. In another design variant, such as that according to FIG. 2, for example, the pair of slots 83e, 83f may be provided in the flywheel mass 21. At least one pair of slots 83e, 83f in this component is preferably collinear with a pair of slots 83a, 83b; 83c, 83d in the outer shaft 15 or the inner shaft 17.

The measures described for forming at least one elastic shaft can be implemented either alternatively or simultaneously with the incorporation of an insert into the toothing.

Figure 5:
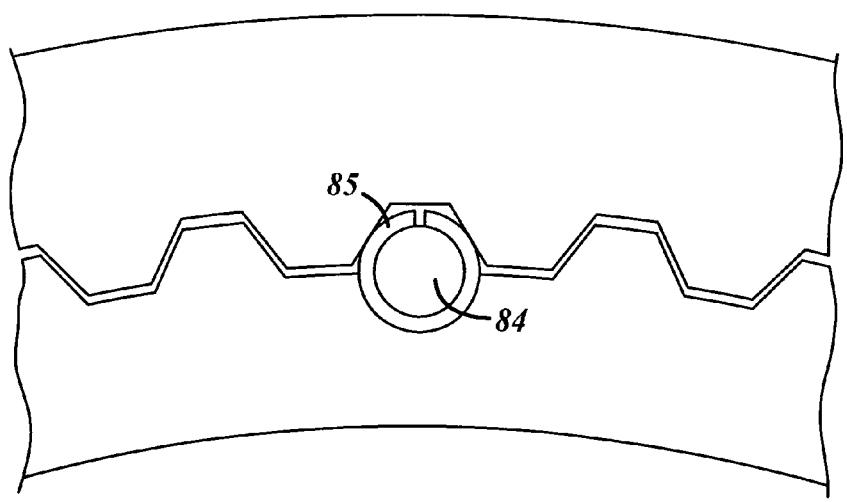

FIG. 5 shows a further alternative development of the invention in which, instead of a tooth, a spring pin 84, which runs in the axial direction of the shafts and which consists of a longitudinally slotted spring cylinder 85 made from a spring plate, which is preferably filled with a compressible medium or an elastomer body, is inserted into the toothing. The spring pin is radially compressible, so that it can be inserted as elastic element into two grooves, which are situated opposite one another and run axially in the outer circumferential surface of the inner first shaft and in the inner circumferential surface of the outer second shaft. Depending on the depth of the grooves, the spring pin is in this case capable of generating a radial and/or azimuthal pre-tension between the first and the second shaft, so that these in this case bear fixedly against one another at least on that side of the toothing opposite the spring pin, thereby generating the desired frictional grip.

FIG. 7 shows a schematic representation of the first and second shaft with the toothing, in which in a first example, in the axially defined section 86 recesses are provided in the individual teeth of the external toothing, into which recesses an O-ring 87 is inserted, which completely encloses the inner shaft and which has a diameter such that it is compressed between the first and the second shaft and therefore generates a radial pre-tension between the shafts. The O-ring 87 is typically composed of an elastomer having a high coefficient of friction, so that the frictional forces between the two shafts are relatively large.

A second example is also shown in the same figure, in the form of the O-ring 88, which may be provided as an alternative or simultaneously with the O-ring 87 and which is arranged in a section of the first shaft 17, which does not carry any toothing but has a smooth cylindrical surface, into which only one groove is introduced to accommodate the O-ring 88.

On the other side a groove, in which the O-ring 88 engages, in such a way that it is radially compressed at least to a degree and therefore generates a radial pre-tension between the shafts, may likewise be provided on the inner circumferential surface of the second shaft 15.

FIGS. 8 to 16 show a special, particularly optimized development of the invention, in which spring elements are fixed to a common ring, in such a way that they can be introduced together into a toothing, in order to flexibly take up the existing play between the teeth of an internal toothing and an external toothing.

Figure 8B:
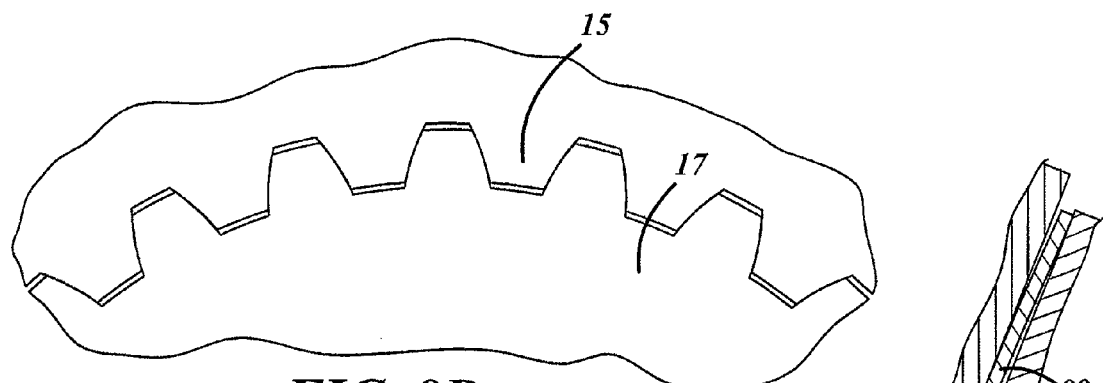

FIG. 8 here shows, in part b), an external toothing in a section A-A, which is indicated in part a) of the figure. Without further measures, a play between the internal and external toothing leads to the generation of rattling noises, especially at low speeds. The invention is intended to prevent or reduce such noises. As also in the other figures, the first shaft is again denoted by the reference numeral 17, the second shaft by 15.

Figure 9B:
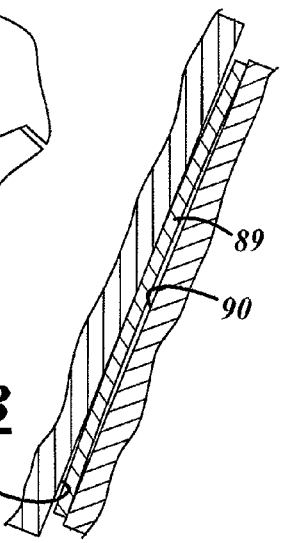
FIGS. 9A and 9B show serrated toothing with an insert.
Figure 9A:
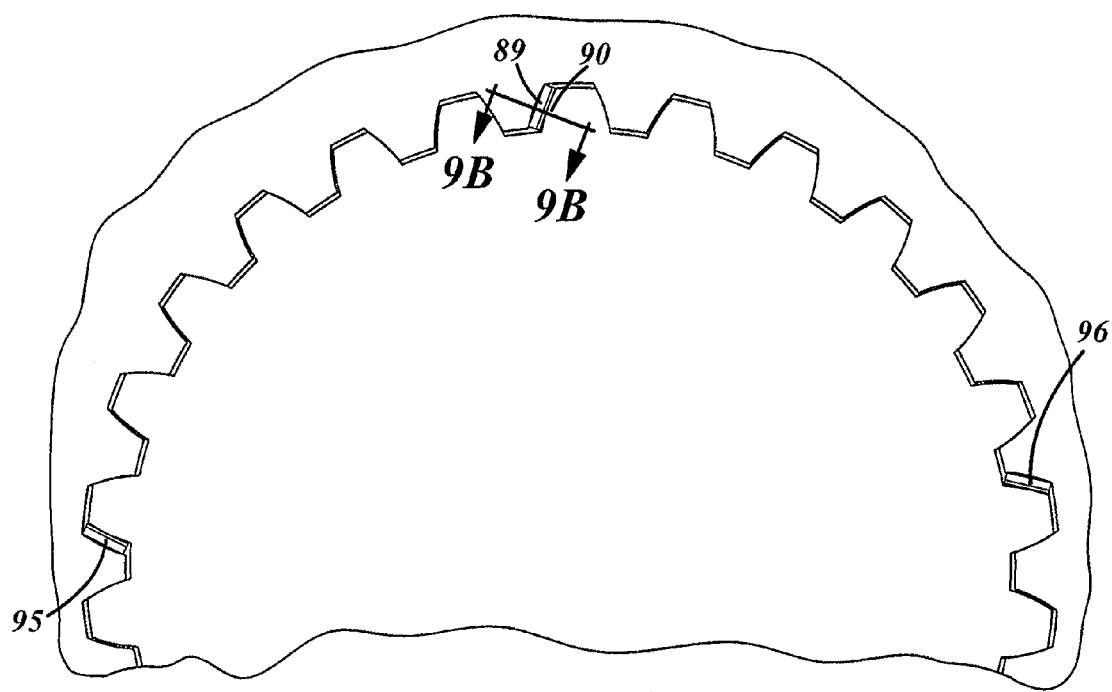

FIG. 9, by way of example, shows the insertion of a spring plate 89 between a tooth 90 of an external toothing and a tooth 91 of an internal toothing. It is clear from the FIG. 9B that in the middle of the tooth flank of the tooth 90 the spring plate 89 curves away from said tooth and can be elastically pressed against the flank. In principle, however, it makes no difference whether the convex face of the spring plate bears against the external or the internal toothing.

In addition further spring plates 95, 96 are shown uniformly distributed over the circumference of the toothing.

In order to readily accommodate the spring plates, a tooth of the external toothing or a corresponding tooth in the internal toothing can in each case be of narrower design, or the free space to be created can be spread between both toothing systems. However, this measure is particularly easy to implement in the case of the internal toothing.

The chosen number of spring elements provided also depends, among other things, on the transmitted torque at which the rattling noises are to be suppressed. In order to avoid imbalances, however, the plates are advantageously arranged symmetrically around the circumference.

FIG. 10, in a perspective view shows an arrangement of four spring plates, which are fixably connected to an integral common ring 92 and are thereby fixedly positioned in relation to one another. By means of the ring 92, the spring plates can be inserted together into the toothing and fixed there. The ring 92 has a diameter approximately equal to the diameter of the toothing.

FIGS. 11A and 11B show developed representations of the internal and the external toothing prior to the insertion process. The internal toothing with the tooth 90 and the inserted spring plate from 89 from FIG. 9, together with the spring plate 95 are represented in the lower part of each of these figures. Overall, in FIG. 11A all spring plates bear on flanks of the internal toothing oriented in the same circumferential direction. This means that the ring 92 can easily be turned in a circumferential direction, so that the spring plates can be released from the toothing, as in the case shown in FIG. 11B. This creates a problem when putting the toothing together, which means that either the insertion is prevented or impeded or that the spring plate is removed or destroyed. This problem can be solved, as shown in FIGS. 12A and 12B, for example, by an azimuthal pre-tensioning of the ring 93 in the direction of the arrows 97, 98. For this purpose the ring 93 has radial spokes, which can be braced in relation to the first shaft 17 carrying the external thread. The spokes themselves may at the same time serve as springs, which are supported against abutments on the first shaft.

FIG. 13 shows another measure for ensuring easy assembly of the arrangement in the form of angle plates 99, 100, which are fixed to the side of the spring plates 101, 102 remote from the ring 93 and which each grip at least partially around the end face of a tooth of the internal toothing. In this way the hooked ends of the spring plates are supported on the internal toothing. As a result, the spring plates, in a fitting operation indicated by the arrow 103 in FIG. 13, are not bent in relation to one another, even when the toothing systems are poorly positioned.

An independent pre-tensioning of the ring in the circumferential direction is rendered altogether dispensable by the measure represented in FIG. 14, whereby several of the spring plates 104, 105 bear against flanks 106, 107 of the internal toothing oriented in opposite circumferential directions. The individual spring plates can thereby be circumferentially braced against one another, automatically centering the ring 94.

Figure 15B:
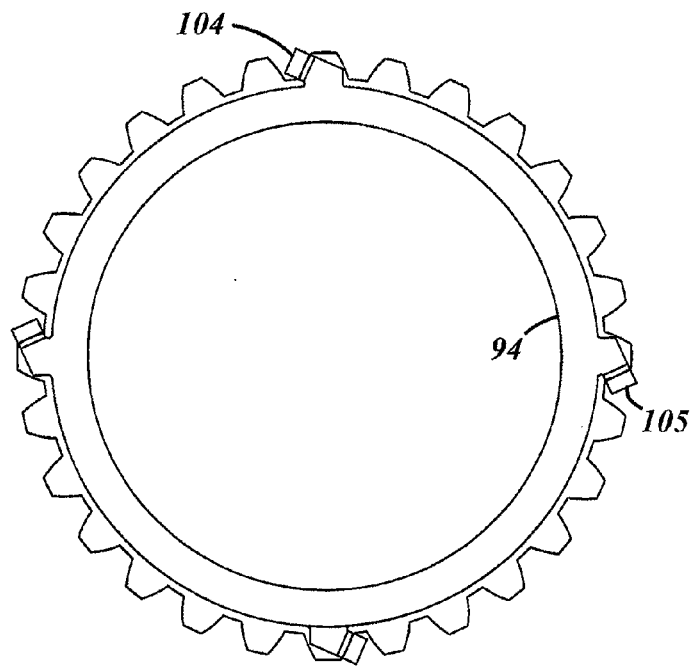

FIGS. 15A and 15B show perspective and top views of this development in part of the internal toothing with the ring 94.

It appears advantageous to provide two pairs, or better still three pairs, of opposing spring plates in such a design construction.

Figure 16:
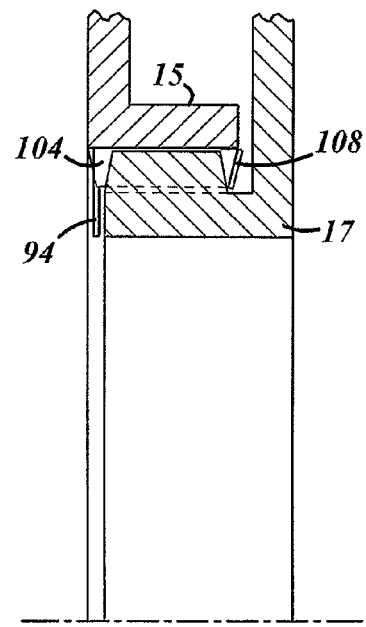
FIG. 16 shows a cross section through the toothing with ring inserted together with spring plates.

FIG. 16 finally shows a section through an inserted toothing, the external toothing being arranged on the first shaft 17 and the internal toothing of the second shaft 15. A spring plate 104 is shown, which on the left-hand side is secured by the ring 94 and on the right-hand side by the angle plate 108.

This affords the greatest possible security in conjunction with easier assembly at a low design cost. For the sake of completeness it should be mentioned that the invention as described above can be similarly embodied by spring plates arranged and locked on the external toothing.

The invention can also be adapted in yet another way in the case of a coupling device for transmitting torque between a drive element and clutch, having a first shaft 17 and second shaft 15 enclosing the former. It is assumed here that the two shafts are coupled together by means of a connection with some play positively interlocking in a circumferential direction, in particular a toothing system. In the said further adaptation of the invention, at least one of the shafts, on at least one part of its circumference, has an axially separated section, which is moveable in relation to the remaining part and which also has a part of the positively interlocking connection, and which in an axial and/or radial and/or azimuthal direction and/or through a tumbling motion can be elastically braced in relation to the remaining part of the respective shaft.

The term tumbling motion is here intended to mean a torsion about an axis aligned perpendicularly to the longitudinal axes of the shafts.

The elastic bracing is here advantageously achieved by spring-elastic elements, such as elastomer elements or metal springs, for example, which act on the separated section on the one hand and the remaining part of the respective shaft on the other.

In a simple design construction the separated section may be a cylindrical section of a shaft, which is produced by dividing the shaft in an axial direction. It is particularly advantageous here if this is a separated section of the outer shaft, which has a part of the internal toothing, which meshes in the external toothing of the inner shaft. A slight shift, torsion or tilting of the separated section in the manner described inevitably causes it to bear against the toothing of the other shaft and therefore cancels out the mechanical play.

The magnitude of the elastic forces applied in the bracing depends on the magnitude of the transmitted forces under which the coupling is to be free of play.

Figure 17A:
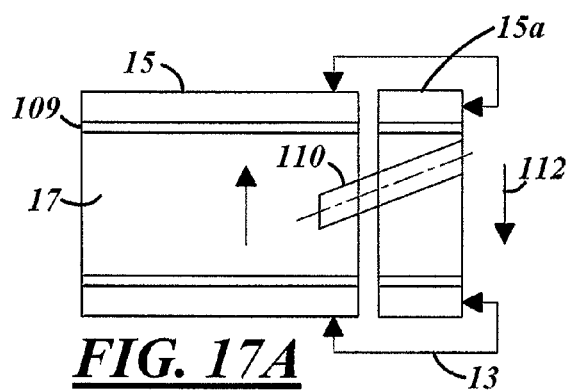
FIGS. 17A, 17B and 18 show examples of a coupling with a separated axial section of the second, outer shaft, which can be braced in relation to the remainder of the shaft.
Figure 17B:
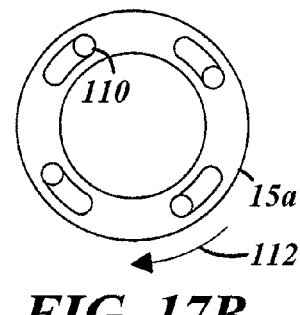
Figure 18:
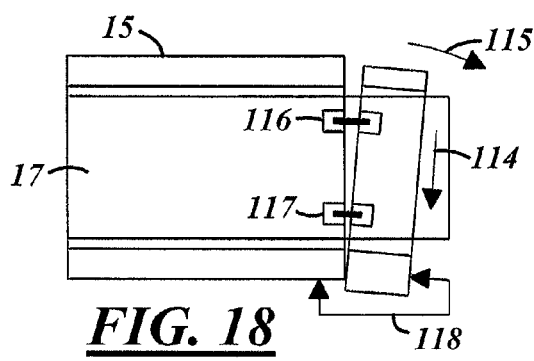

Examples of such a coupling are represented in FIGS. 17 and 18.

According to FIG. 17 a continuous first shaft 17, the inner shaft, is provided, which carries an external thread, together with an outer second shaft 15, 15a, which is axially divided into two parts, that is the separated section 15a and the remaining part of the second shaft. The area of the intermeshing toothing is denoted by 109. Both the separated section and the remaining part of the second shaft have recesses for fixing springs 110, which are distributed over the circumference and which run obliquely to the central axis of the shafts and on tensioning lead to a torsion of the separated section in relation to the remaining part of the second shaft about the longitudinal axis of the shaft. The direction of the torsion is indicated by the arrows 111 and 112. The turning of said parts in opposition to one another means that at least one tooth, either of the separated section or the remaining part of the second shaft 115, 115a, will always bear against the external toothing of the first shaft 17.

In addition, by tensioning the springs, only one of which is denoted by 110 and which may be embodied as spring steel helical springs, or by means of other, additional spring elements (which in the figure are symbolically denoted as the clamp 113), an axial compression can be exerted on the two parts 15, 15a, in order to stabilize the torsion by means of static friction forces.

FIG. 18 shows a variant, in which the separated section 15a is on the one hand offset in the direction of the arrow 114, substantially perpendicularly to the longitudinal axis of the shafts 15, 17, and in which the separated section 15a is additionally tilted by a slight angle relative to the remaining part of the second shaft in the direction of the arrow 115.

Each of the individual offset and tilting measures may of itself be sufficient to achieve the object of the invention, namely to cause it to bear against the opposing external toothing of the inner, first shaft 17. The separated section is held in the position assumed at any time by means of the spring elements 116, 117, which may take the form of rubber pins, for example.

In addition, yet another spring element 118 may be provided, which presses the parts 15, 15a together and thereby generates a static frictional force, which stabilizes the offset and thereby the elastic fit of the overall configuration. The overall configuration is such that the internal toothing, at least in the area of one tooth, firmly bears elastically on the external toothing.

For the sake of clarity, the extent of the displacement, torsion or tilting of the separated section is represented so that it is clearly visible, without reference to the actual scale of the variation in position, which may be more or less than shown.

The embodiments of the invention described ensure that ratting between the first and the second shaft due to play in the toothing does not occur under the load changes, which can easily occur in internal combustion engines in motor vehicles, for example. It will be obvious that said measures may be applied individually or also in combination with one another.

In an advantageous design variant, at least two elastic elements are therefore provided, which have a graduated effect. For example, as first elastic element for a first stage, one or more elastic inserts may be provided, which under the torques to be transmitted take effect in a first torque range, preferably a range from 10 Nm to 30 Nm. From a torque limit, which preferably lies approximately in a range between 30 Nm and 60 Nm, at least a second elastic element takes effect for the second stage. These may be spring plates fixed to a common ring, for example.

This minimum of one second elastic element may act as an alternative or in addition to at least one first elastic element of the first stage. If one or more first elements lock up from a certain torque onwards, for example, from this torque onwards only the second elastic element for the second stage will be operative. If, on the other hand, one or more first elastic elements for the first stage possess a residual elasticity in excess of the torque limit, the elastic elements for both stages will be operative above the torque limit.

More than the two stages described can obviously be created through a corresponding combination of elastic elements. In principle any number of such stages can be provided, although two or three stages are preferably formed.

The description of the invention is merely exemplary in nature and, thus, variations that do not depart from the gist of the invention are intended to be within the scope of the invention. Such variations are not to be regarded as a departure from the spirit and scope of the invention.

LIST OF REFERENCE NUMERALS 1 first outer plate carrier
2 second outer plate carrier
3 first flange
4 second flange
5 internal toothing
6 internal toothing
7 splines
8 splines
9 hollow shaft
10 solid shaft
11 clutch housing
12 torsional vibration damper
13 secondary element
14 primary element
15 primary flange/second shaft
15a separated section of the second shaft
16 splines
17 inner flange/first shaft
18 swash plate
19 outer edge bore
20 rivets
21 flywheel mass
22 bore
23 bore
24 crankshaft
25 tapped hole
26 bolt
27 first plate pack
28 second plate pack
29 outer plate
30 outer plate
31 external toothing
32 external toothing
33 inner plate
34 pressure plate
35 end plate
36 inner plate
37 pressure plate
38 internal toothing
39 internal toothing
40 inner plate carrier
41 external toothing
42 external toothing
43 first operating piston
44 second operating piston
45 opening
46 opening
47 opening
48 locking ring
49 pressure piston
50 pressure piston
51 piston
52 piston
53 helical spring
53a helical spring
54 helical spring
55 compensating piston
56 compensating piston
57 circumferential web
58 circumferential web
61 clutch hub
62 carrier
63 hydraulic fluid duct
64 hydraulic fluid duct
65 hydraulic fluid duct
66 hydraulic fluid duct
67 joint
68 pump drive gear
69 first hydraulic fluid compensation chamber
70 second hydraulic fluid compensation chamber
71 first hydraulic fluid operating chamber
72 second hydraulic fluid operating chamber
73 coolant chamber
74 clutch housing
75 first coolant baffle plate
76 second coolant baffle plate
77 cylinder
78 locking ring
80 external toothing
81 leaf spring
82 relative movement in circumferential direction
83a slot
83b slot
83c slot
83d slot
83e slot
83f slot
84 spring pin
85 spring cylinder
86 axially defined section
87 O-ring
88 O-ring
89 spring plate
90 tooth
91 tooth
82 ring
93 ring
94 ring
95 spring plate
96 spring plate
97 pre-tensioning direction
98 pre-tensioning direction
99 angle plate
100 angle plate
101 spring plate
102 spring plate
103 insertion process
104 spring plate
105 spring plate
106 flank
107 flank
108 angle plate
109 area of intermeshing toothing
110 spring
111 direction of torsion
112 direction of torsion
113 symbolized representation of spring elements
114 offset direction
115 tilting direction
116 spring element
117 spring element
118 spring element

The invention claimed is:
1. A coupling device for transmitting a torque between a drive element and a clutch, said clutch device comprising of said clutch having a first shaft and a second shaft enclosing said first shaft, said first shaft and said second shaft being coupled together by a circumferentially positively interlock- ing connection wherein said first shaft carries external toothing, which meshes in internal toothing of said second shaft; and an elastic element for generating a pretension in the positively interlocking connection, said elastic element comprising multiple spring plate inserts in such a way that said spring plate inserts can each be pressed elastically against a flank of a tooth against which said spring plate inserts bear, said spring plate inserts being connected to an integral common ring wherein a diameter of said common ring is approximately equal to a diameter of said flank of said tooth against which said spring plate inserts bear.

2. The coupling device as claimed in claim 1, wherein each of said multiple spring plate inserts distributed over a circumference of the said common ring bear on a corresponding flank of a tooth oriented in the same circumferential direction.

3. The coupling device as claimed in claim 1, wherein said common ring can be circumferentially tensioned by spring means in such a way that the each of said multiple spring plate inserts are pressed against a corresponding flank of a tooth against which said each of said multiple spring plate inserts bear.

4. The coupling device as claimed in claim 1, wherein at least two of said multiple spring plate inserts distributed over the circumference of said common ring bear partly on a flank of a tooth oriented in opposite circumferential directions.

5. The coupling device as claimed in claim 1, wherein the first shaft is connected to a swash plate connected to the drive element and moveable in relation to the latter.

6. The coupling device as claimed in claim 1, wherein the first shaft is connected to a flywheel connected to the drive element.

7. The coupling device as claimed in claim 1, wherein the second shaft is connected to a torsion damper.

8. The coupling device as claimed in claim 1 wherein at least one of the spring plate inserts at an end remote from said common ring in the axial direction of the shafts has an angle plate, which grips around a tooth on which the spring plate insert bears towards a face of said tooth.

* * * * *

UNITED STATES PATENT AND TRADEMARK OFFICE
CERTIFICATE OF CORRECTION

PATENT NO. : 8,376,649 B2
APPLICATION NO. : 12/083703
DATED : February 19, 2013
INVENTOR(S) : Johannes Heinrich et al.

It is certified that error appears in the above-identified patent and that said Letters Patent is hereby corrected as shown below:

In the Specifications

LIST OF REFERENCE NUMERALS

Column 14,

Line 34, "82 ring" should be --92 ring--.

Signed and Sealed this
Thirtieth Day of July, 2013

Teresa Stanek Rea
*Acting Director of the United States Patent and Trademark Office*